(12) United States Patent
Prabhakar et al.

(10) Patent No.: US 11,064,713 B2
(45) Date of Patent: Jul. 20, 2021

(54) SHELF STABLE RTD COCOA MILK BEVERAGE WITH IMPROVED TEXTURE/MOUTHFEEL AND METHOD OF MAKING SAME

(71) Applicant: NESTEC S.A., Vevey (CH)

(72) Inventors: Veena Prabhakar, Dublin, OH (US); Yubin Ye, Dublin, OH (US); Guadalupe Del Carmen Aldape Farias, Dublin, OH (US); Valerie Jean Bailey, Marysville, OH (US); Madansinh Nathusinh Vaghela, Macedonia, OH (US); Philippe Rousset, Dublin, OH (US); Alexander Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 95 days.

(21) Appl. No.: 16/312,427

(22) PCT Filed: Jun. 27, 2017

(86) PCT No.: PCT/EP2017/065773
§ 371 (c)(1),
(2) Date: Dec. 21, 2018

(87) PCT Pub. No.: WO2018/001998
PCT Pub. Date: Jan. 4, 2018

(65) Prior Publication Data
US 2019/0239531 A1 Aug. 8, 2019

Related U.S. Application Data

(60) Provisional application No. 62/355,497, filed on Jun. 28, 2016.

(51) Int. Cl.
*A23G 1/56* (2006.01)
*A23G 1/40* (2006.01)
*A23L 2/66* (2006.01)
*A23L 2/46* (2006.01)
*A23L 2/60* (2006.01)
*A23L 2/68* (2006.01)

(52) U.S. Cl.
CPC .............. *A23G 1/56* (2013.01); *A23G 1/40* (2013.01); *A23L 2/46* (2013.01); *A23L 2/60* (2013.01); *A23L 2/66* (2013.01); *A23L 2/68* (2013.01); *A23V 2002/00* (2013.01)

(58) Field of Classification Search
CPC ...................................................... A23G 1/56
See application file for complete search history.

(56) References Cited

U.S. PATENT DOCUMENTS

2009/0041920 A1* 2/2009 Eibel .................... A23C 9/1422
426/582
2013/0122152 A1* 5/2013 Pascual .................... A23G 1/56
426/71

FOREIGN PATENT DOCUMENTS

WO 2014086690 6/2014

OTHER PUBLICATIONS

Corredig et al. "Effect of temperature and pH on the interactions of whey proteins with casein micelles in skim milk" Food Research International, 1996, vol. 29, No. 1, pp. 49-55.
Anonymous "Kelcogel TM, Gellan Gum Book", Jan. 1, 2007, pp. 1-29, XP002646532.
Palsgaard "How to make a delicious chocolate milk" Oct. 1, 2010, 5 pages, XP55399977.

* cited by examiner

*Primary Examiner* — Jeffrey P Mornhinweg
(74) *Attorney, Agent, or Firm* — K&L Gates LLP

(57) ABSTRACT

The present invention relates to ready-to-drink cocoa milk beverage products. In particular, the invention is concerned with a protein system induced by controlled aggregation of milk proteins which imparts outstanding sensory attributes and improved physical stability of the beverage products, in particular when containing low fat and/or low sugar. A method of 5 producing such beverage and the products obtainable from the method are also part of the present invention.

15 Claims, 3 Drawing Sheets

Figure 3

Figure 1:
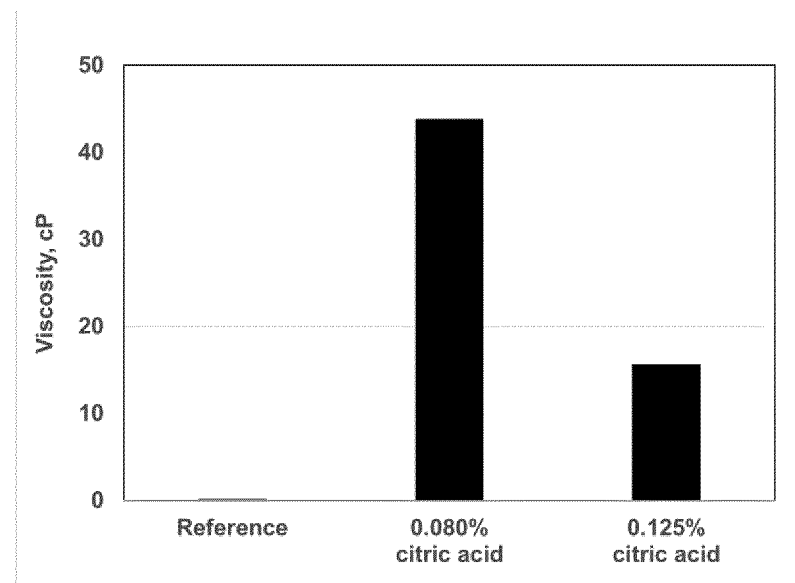

| Citric acid (anhydrous), % | 0.045 | 0.065 | 0.080 | 0.095 | 0.110 | 0.125 |
|---|---|---|---|---|---|---|
| Sensory evaluation | significant texture improvement | significant texture improvement | significant texture improvement | significant texture improvement | significant texture improvement; some panelists perceived acidic, sour notes | Viscosity and texture decreases as compared to those with 0.080% and 0.095% citric acid products; beverage has sandy mouthfeel and sour notes |

Figure 4

| Lactic acid (80%), % | 0.050 | 0.065 | 0.080 | 0.095 | 0.110 | 0.125 | 0.150 |
|---|---|---|---|---|---|---|---|
| Sensory evaluation | slight texture improvement | significant texture improvement | significant texture improvement | significant texture improvement | significant texture improvement; some panelists perceived acidic, sour notes | significant texture improvement; beverage has acidic, sour notes | significant texture improvement; beverage has acidic, sour notes, sandiness |

SHELF STABLE RTD COCOA MILK BEVERAGE WITH IMPROVED TEXTURE/MOUTHFEEL AND METHOD OF MAKING SAME

CROSS REFERENCE TO RELATED APPLICATIONS

The present application is a National Stage of International Application No. PCT/EP2017/065773, filed on Jun. 27, 2017, which claims priority to U.S. Provisional Application No. 62/355,497, filed on Jun. 28, 2016, the entire contents of which are being incorporated herein by reference.

FIELD OF THE INVENTION

The present disclosure generally relates to milk containing beverages with improved texture/mouthfeel by controlled protein aggregation at ultra-high temperature (UHT) treatment conditions using all-in-one process. More specifically, the present disclosure relates to ready to drink ("RTD") reduced fat and/or sugar beverages containing milk, cocoa, malt and a hydrocolloid stabilizing system, and also relates to methods for making the same.

BACKGROUND OF THE INVENTION

Fat and sugar reductions are the two main choices of a health-conscious consumer. Such a reduction does have an impact on taste and texture/mouthfeel. Thus, with regard to fat reduction, by evolving from using cream, whole milk to reduced fat milk, creaminess, texture/mouthfeel perception of the beverage is negatively affected. Today's consumer is demanding good value low calorie product without a compromise in taste and texture. Such a solution to the problem is a challenge.

Another problem faced with reduction of fat and/or sugar in RTD beverages is the shelf stability of the product, e.g. phase separation, syneresis, layering, creaming and/or sedimentation. Additional challenge is an undesirable increase of beverage age gelation issues during shelf life storage.

Thus, the objective of this invention is to achieve both the requirements below:
to develop shelf stable low fat/low sugar RTD cocoa milk beverages with indulgent texture/mouthfeel of whole milk fat/full sugar (about 17 g/per 240 ml serving) products using unique combination of stabilizing ingredients, acidifier and all-in-one process of creating desired protein aggregates at UHT conditions;
to provide good product physical stability over product shelf-life.

The majority of existing solutions with indulgent mouthfeel have high calories. There are limited solutions for low fat/low sugar shelf stable RTD beverages which have texture/mouthfeel similar to that of high fat/high sugar beverages. On the other hand, some existing low calorie versions are lacking in thick, creamy texture. Some RTD solutions, though compromised partially in mouthfeel, are only for the refrigerated beverages.

Therefore, there is a need to improve texture/mouthfeel of reduced fat/reduced sugar RTD cocoa milk beverages without compromising product physical stability during long shelf-life (6-month or more) at ambient and/or refrigerated temperatures.

SUMMARY OF THE INVENTION

The present disclosure provides a ready-to-drink (RTD) cocoa milk beverage and also provides methods for making such beverages. The ready-to-drink cocoa milk beverages can have reduced sugar and/or fat, can be extended shelf life (ESL) or aseptic, and can have a pleasant mouthfeel.

The ready-to-drink cocoa milk beverages have an improved physico-chemical stability during storage, e.g., stable for at least 6 months at refrigeration for ESL products; and 6 months at refrigeration, 20 and 30° C., and 2 months at 38° C. for aseptic products. The cocoa milk beverage overcomes phase separation/instability issues during different storage conditions over the full life of the beverages.

The object of the present invention relates to solving the problems of:
(i) lack of texture/mouthfeel in reduced fat/reduced sugar RTD, and;
(ii) physical instability issues of reduced fat/reduced sugar RTD.

The benefits of the present invention includes the following:
Ability to produce low calories aseptic RTD beverages with indulgent creamy, thick product texture/mouthfeel;
Enable the product to keep the unique texture and taste during its shelf life;
Provide enhanced shelf-life physical stability without syneresis, sedimentation, creaming; and
Avoid gelation issues.

Thus, the present invention solves the foregoing problems by providing a stable beverage having enhanced or improved organoleptic properties.

Provided is a composition of aseptic shelf-stable liquid RTD beverage, formed by the interaction of milk proteins (such as casein and whey), carbohydrate(s), acidifier and optionally milk fat, sweetener(s), flavor(s), and a stabilizer system containing the combinations of hydrocolloids.

The present invention provides indulgent, creamy texture/mouthfeel similar to that of whole milk and full sugar beverage but at lower calorie level (reduced fat and/or sugar) and method to make the same.

In a first aspect, the invention relates to a ready to drink (RTD) beverage comprising:
milk comprising casein and whey proteins wherein ratio between casein and whey protein ranges from 80:20 to 60:40 and wherein milk comprises 0.5 to 2.5 wt/wt % milk proteins and up to 2 wt/wt % milk fat;
added sugar up to 5 wt/wt %;
an acidifier;
cocoa in the range of 0.5 1.5 wt/wt % and
a stabilizing system comprising a high acyl gellan gum in the range of 0.01 to 0.03 wt/wt %, and guar gum in the range of 0.09 to 0.2 wt/wt %;
wherein the beverage comprises casein-whey protein aggregates having a Sauter mean diameter value D[3,2] ranging from 6 to 15 µm as measured by laser diffraction.

The RTD beverage further comprises added whey proteins to achieve casein:whey ratio in range of 75:25 to 60:40.

The aseptic RTD beverages are shelf-stable for at least 6 months at 4, 20 and 30° C., and at least 2 month at 38° C. The ESL RTD beverages are shelf-stable at 4° C. for at least 6 months.

The products of the invention present excellent organoleptic properties, in particular in terms of texture and mouthfeel, even when very low levels of fat and/or sugar are used. Besides, the products of the invention show good physical stability over extended product shelf-life.

Thus, using the novel approach of combining 1-step protein aggregation with acidifier and new hydrocolloid system, the invention not only improves product texture/mouthfeel but also overcomes physical instability issues during product shelf-life.

Another aspect of the present invention relates to a method of producing a RTD beverage comprising the steps of:
  Mixing ingredients as defined above;
  Homogenizing the mixture at total pressure ranging from 135-300 bars and temperature ranging from 65-80° C.;
  Sterilizing at UHT conditions at 136-150° C. for 3-30 seconds
  Cooling the obtained beverages to 30° C. or below; and
  Filling aseptically UHT beverages in aseptic containers.

BRIEF DESCRIPTION OF FIGURES/TABLES

FIG. 1 represents viscosity of beverages prepared with 0.08% and 0.125% citric acid, and without citric acid.

Figure 2:
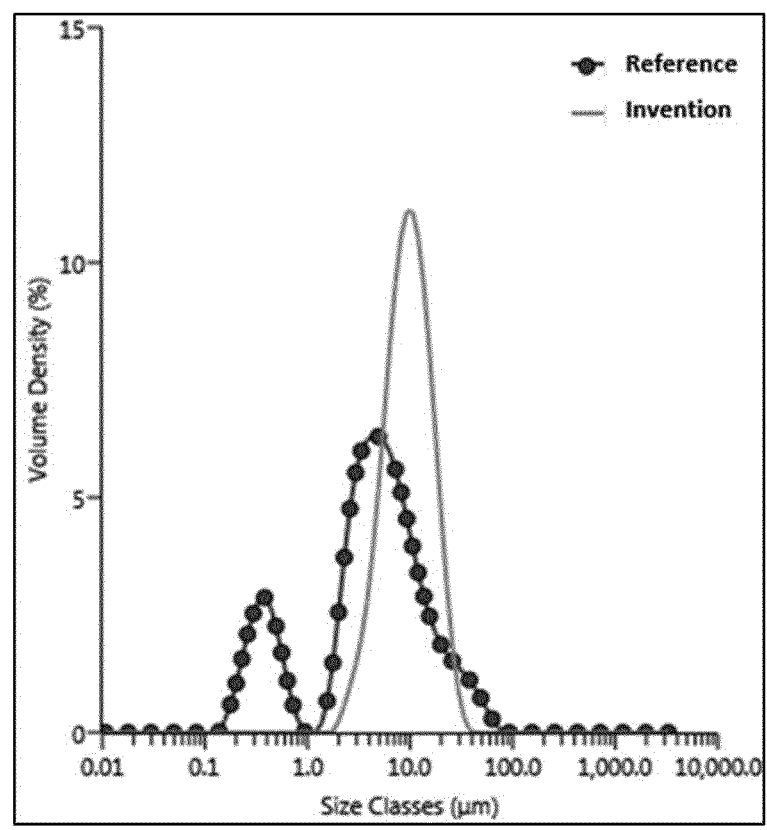

FIG. 2. Particle size distribution of the RTD beverages with and without controlled protein aggregation using lactic acid.

FIG. 3. Sensory evaluation of the RTD beverages with controlled protein aggregation (CPA) using citric acid.

FIG. 4. Sensory evaluation results of the RTD beverages with controlled protein aggregation (CPA) using lactic acid.

DETAILED DESCRIPTION OF THE INVENTION

In the following description, the % values are in wt/wt % unless otherwise specified.

The present invention pertains to protein containing beverage, more particularly to RTD beverage. The present invention addresses the following issues:
  Poor/watery product texture/mouthfeel of reduced fat/reduced sugar RTD beverages
  Physical instability issues of reduced fat/reduced sugar RTD beverages There are no current solutions using controlled protein aggregation for shelf stable RTD beverages with low sugar/fat content which have a mouthfeel similar to full sugar beverages and are shelf-stable during the life of the beverage.

Advantageously and unexpectedly, a unique combination of the hydrocolloid stabilizing system, specific ratio of casein to whey proteins, specific levels of acidifier and UHT process conditions were found to improve beverage texture/mouthfeel and provide a pleasant, smooth creamy taste of RTD beverage. In addition, the desired texture improvement and desired product shelf life stability were found only when the homogenization was done prior to applying UHT treatment and removing any post UHT process homogenization step, if any.

As a result, the reduced fat/reduced sugar RTD beverage has improved texture and good physico-chemical stability during shelf life. The novel hydrocolloid texturizing/stabilizing system includes stabilizing system comprising a high acyl gellan gum in the range of 0.01 to 0.03 wt/wt %, and guar gum in the range of 0.09 to 0.2 wt/wt %;

In one embodiment of the present invention, the term "milk" constitutes milk protein in the range of 0.5 to 2.5 wt/wt %. In another embodiment the milk fat is up to 2 wt/wt %.

In one embodiment of the present invention, the RTD beverage comprises casein-whey protein aggregates having a Sauter mean diameter value D[3,2] ranging from 6 to 15 µm as measured by laser diffraction. FIG. 2 shows particle size distribution of the RTD beverages with and without controlled protein aggregation using lactic acid. As one can see, the reference has bi-model particle size distribution, which having a Sauter mean diameter value D[3,2] about 1.0 µm; whereas the beverage with controlled protein aggregation showed only one peak with Sauter mean diameter value D[3,2] ranging from 6 to 15 µm.

If we use the hydrocolloids outside the above ranges, phase separation issues (e.g. serum, sedimentation) occur.

In one embodiment of the present invention, the stabilizing system comprises high acyl gellan gum in the range of 0.01 to 0.03 wt/wt %, and guar gum in the range of 0.09 to 0.2 wt/wt %. We found that only highly acyl form of the gellan gum provides the required shelf-life stability.

In one embodiment of the present invention, the acidifier comprises but not limited to lactic acid, citric acid, phosphoric acid, ascorbic acid, acetic acid, malic acid, hydrochloric acid, glucono delta-lactone, molasses, fruit derived acids and fermentation derived acids or combination of thereof. The term "glucono delta-lactone" is a lactone (cyclic ester) of D-gluconic acid. Upon addition to water, glucono delta-lactone is partially hydrolysed to gluconic acid, with the balance between the lactone form and the acid form established at chemical equilibrium.

In another embodiment of the present invention, wherein the acidifier is citric acid in the range from 0.03 to 0.09 wt/wt %. Addition of citric acid significantly increases beverage viscosity. However, addition of high level of citric acid surprisingly does not bring additional increase of product viscosity (FIG. 1).

Sensory evaluation results of the RTD beverages with controlled protein aggregation (CPA) using citric acid at different levels is shown in FIG. 3. Addition of citric acid increases beverage texture/mouthfeel. However, level of added acid has limitation due to bringing acidic, sour notes to the product perceived by some panelists. High level of citric acid (0.125 wt/wt %) leads to sandy mouthfeel which is a result of protein over-aggregation and/or precipitation. Best product quality was found by using from 0.045 to 0.09 wt/wt % by taking in account texture improvement without acidic off-notes and protein over-aggregation. In another embodiment of the present invention, similar to citric acid behavior was also found with other acids, e.g., lactic acid.

In one embodiment of the present invention, wherein the acidifier is lactic acid in the range from 0.065 to 0.10 wt/wt %. Sensory evaluation of the RTD beverages with controlled protein aggregation (CPA) using lactic acid at different levels is shown in FIG. 4. Increase in latic acid levels increases beverage texture/mouthfeel. However, level of added acid has limitation due to bringing acidic, sour notes to the product perceived by some panelists. Best product quality was found by using from 0.065 to 0.10 wt/wt % lactic acid by taking in account texture improvement without acidic off-notes.

In one embodiment of the present invention, the RTD beverage further comprises sodium chloride in the range from 0.01 to 0.02 wt/wt %.

In one embodiment of the present invention, the RTD beverage further comprises calcium salts for calcium fortification.

In one embodiment of the present invention, the calcium salt comprises but not limited to calcium phosphate, calcium carbonate, calcium lactate-citrate, calcium citrate, or combination of thereof.

In an embodiment, the product includes addition of sugar, wherein sugar is sucrose up to about 5 wt/wt %.

In an embodiment, the product optionally includes addition of natural and/or artificial sweeteners.

In an embodiment, the product includes addition of cocoa powder.

In an embodiment, the product includes flavors. The flavors are preferably selected but not limited to chocolate, vanilla, milk flavors or combination of thereof.

Liquid Beverage Composition and Product

A beverage according to the invention comprises the RTD beverage as described in the present invention and may e.g. be in the form of a ready-to-drink beverage. By a ready-to-drink beverage is meant a beverage in liquid form ready to be consumed without further addition of liquid. A beverage according to the invention may comprise any other suitable ingredients known in the art for producing a beverage, such as e.g. sweeteners, e.g. sugar, such as invert sugar, sucrose, fructose, glucose, or any mixture thereof, natural or artificial sweetener; aromas and flavors, e.g. chocolate, vanilla, milk flavors or combination of thereof; milk and/or milk derivatives; acidifiers; stabilizers; natural color; or combination of thereof.

A ready-to-drink beverage may be subjected to a heat treatment to increase the shelf life or the product, UHT (Ultra High Temperature) treatment, HTST (High Temperature Short Time) pasteurization, batch pasteurization, or hot fill.

Milk protein containing liquid beverages are beverages or beverage concentrates containing milk (e.g. fluid, fat-removed, lactose-removed, powder, concentrate, fractionated) or the proteins obtained, whether native or modified, from milk, or a mixture thereof.

According to a particular embodiment, the presence of an acidic component preferably selected but not limited from the group consisting of lactic acid, citric acid, phosphoric acid, ascorbic acid, acetic acid, malic acid, hydrochloric acid, glucono delta-lactone, molasses, fruit derived acids and fermentation derived acids.

According to a particular embodiment, the product according to the invention comprises about 0.5 to 2.5 wt/wt % milk protein, up to about 2 wt/wt % milk fat and sweetening agent, e.g. sugar from about 0 to 5 wt/wt %.

In an embodiment, the product includes addition of cocoa powder. Cocoa powder can be hydrated (e.g., wetted) for 90 minutes at 90° C. to form the cocoa slurry.

By "sweetening agent" it is to be understood an ingredient or mixture of ingredients which imparts sweetness to the final product. These include natural sugars like cane sugar, beet sugar, molasses, other plant derived nutritive and non-nutritive sweeteners, and chemically synthesized non-nutritive high intensity sweeteners.

The reduction of fat in beverages without compromising the indulgent quality of the product is one of the main challenges faced by the industry. The present invention is overcoming this issue in providing low fat products with similar texture and sensory attributes than those having higher fat contents in terms of texture/mouthfeel.

The products include a stabilizer system.

A "stabilizer system" is to be understood as an ingredient or a mixture of ingredients which contributes to the stability of the beverage product with respect to shelf life. Thus, the stabilizer system may comprise any ingredients which provide physical stability to the beverage. Stabilizing system of the invention comprises a high acyl gellan gum in the range of 0.01 to 0.03 wt/wt %, and guar gum in the range of 0.09 to 0.2 wt/wt %.

The product further comprises sodium chloride in the range from 0.01 to 0.02 wt/wt %.

The product may additionally comprise flavors or colorants. These are used in conventional amounts which can be optimized by routine testing for any particular product formulation.

It has been surprisingly found out that the presence of this controlled protein aggregation system in a beverage according to the invention improves the sensory profile of the product and in particular that it enhances considerably the smooth and creamy texture of said beverage that contains this system.

It is a common knowledge that addition of proteins to the beverage (e.g. whey) will lead to enhanced mouthfeel. It was surprisingly found that when controlled protein aggregation is created, addition of whey proteins significantly improves (much higher compared to that without protein aggregation) product mouthfeel only at the specific casein to whey ratio, i.e. wherein ratio between casein and whey proteins is from about 75:25 to about 60:40, probably due to the synergy within new structure formation. Addition of whey proteins above 60:40 ratio resulted in decrease of beverage mouthfeel.

The present invention is a directed controlled milk protein aggregation system produced by an acidic component, specific hydrocolloid system and specific heat treatment conditions, i.e. specific combination of acid levels, temperature and holding time which has shown to considerably improve the mouthfeel and creaminess of the beverage of the invention.

Furthermore, the product of the invention has proven to be particularly stable, both when refrigerated as well as when kept at ambient or higher temperatures for human consumption.

The heating temperature ranges from 136-150° C. and holding for 3-30 seconds.

Such a system offers the unexpected advantage that it can confer to the beverage product exceptional sensory attributes with good stability while minimizing the fat and sugar content. The homogenization step of the present invention may be performed in one or two steps. The two step homogenization approach comprises the first step wherein liquid mixture is exposed to a pressure in the range of 100 to 250 bars and followed by a second step having pressure in the range of 35 to 50 bars.

The process of the invention has surprisingly proven to enhance the textural experience of beverages according to the invention even at lower fat and/or sugar contents. The applicant has discovered that combination of acid levels, specific hydrocolloid system, temperature and holding time of the composition and specific casein to whey protein ratio before sterilization results in a product with smooth, creamy texture and superior shelf life stability when compared to typical beverage products. In addition, it is critical to have a homogenization step before the UHT heat treatment.

The method of the invention lends itself to the manufacture of beverages according to the invention which are shelf-life stable at the necessary storage temperatures and have superior organoleptic and textural properties.

EXAMPLES

The present invention is illustrated further herein by the following non-limiting examples.

In this and in the all other examples of the invention, concentrations of ingredients are given as wt/wt % based on the whole product formulation.

Milk containing 1.5% milk fat was used in preparation of all samples described in the examples below.

Rheological measurements were conducted with a Physica MCR 501 rheometer (Anton Paar GmbH, Austria), using a double-gap geometry (DG26.7). Viscosity was measured first from 4° to 40° C. and then 40° to 4° C. at a constant shear rate 75 s$^{-1}$ and a heating/cooling rate of 2° C./min.

Particle size distribution was determined by using a laser light scattering Mastersizer 3000 MA (Malvern Instrument) equipped with Hydro 2000G dispersion unit. The Sauter mean Diameter D[3,2] were reported.

Example 1

Process without Controlled Protein Aggregation (CPA)
The RTD beverages were made by the following process:
Hydration (e.g., wetting) of cocoa powder for 90 minutes at 90° C. to form the cocoa slurry.
A high acyl gellan and guar gums were dry blended with, sucrose and then were added under high agitation to a separate tank containing milk.
The cocoa slurry was added under agitation to the milk tank containing hydrocolloids.
The rest of ingredients such as flavor(s), and mineral(s) were added under agitation.
Aseptic homogenization at 135/35 bars at 70° C.
Subjection of the beverage to ultra-high temperature ("UHT") heat treatment at about 142° C. for about 12 seconds.
The aseptic homogenization is followed by cooling below 30° C. and aseptic filling of the RTD beverage into a suitable aseptic container, e.g. PET bottles, Tetra Pak®, jars, jugs or pouches.
A Sauter mean diameter value D[3,2] determined by laser diffraction was less than 1.5 μm.

Example 2

The RTD beverage with controlled protein aggregation was prepared as in Example 1, but with addition of lactic acid before aseptic homogenization.

Results of sensory evaluation of the final product are shown in FIG. 4.

Comparison of particle size distribution between the reference and the invention is shown in FIG. 2.

Example 3

The RTD beverage with controlled protein aggregation was prepared as in Example 1, but with addition of citric acid before aseptic homogenization.

Results of sensory evaluation of the final product are shown in FIG. 3.

Example 4

The RTD beverage with controlled protein aggregation was prepared as in Example 2 process, using 44 kg of whole milk and 11 kg of skim milk, 0.3 kg of whey proteins, 5 kg sugar, 1 kg of cocoa, 80 g of 80% lactic acid, 50 g of calcium phosphate, 15 g of sodium chloride, 25 g of high acyl gellan gum, 90 g of guar gum, and water necessary to reach 100 kg of the final beverage.

Beverage physico-chemical properties were evaluated and sensory characteristics were judged by trained sensory panelists. The beverage was found to be homogeneous, without a phase separation during shelf-life. Improved texture/mouthfeel of the beverages was found by the sensory panelists (FIG. 4).

A Sauter mean diameter value D[3.2] determined by laser diffraction was about 8 μm.

Example 5

The RTD beverage with controlled protein aggregation was prepared as in Example 4 process, but using 50 g of 80% lactic acid.

Beverage physico-chemical properties were evaluated and sensory characteristics were judged by trained sensory panelists. Physical stability of the beverage was good but practically no texture improvement was found (FIG. 4).

Example 6

The RTD beverage with controlled protein aggregation was prepared as in Example 4 process, but using 110 g of 80% lactic acid.

Beverage physico-chemical properties were evaluated and sensory characteristics were judged by trained sensory panelists. Physical stability of the beverage was good and increased texture/body was found. However, this level of added acid has limitation due to undesirable acidic, sour notes of the beverage perceived by some panelists (FIG. 4).

Example 7

The RTD beverage with controlled protein aggregation was prepared as in Example 2 process, using 44 kg of whole milk and 11 kg of skim milk, 0.3 kg of whey proteins, 5 kg sugar, 1 kg of cocoa, 80 g of anhydrous citric acid, 50 g of calcium phosphate, 15 g of sodium chloride, 25 g of high acyl gellan gum, 90 g of guar gum, and water necessary to reach 100 kg of the final beverage.

Beverage physico-chemical properties were evaluated and sensory characteristics were judged by trained sensory panelists. The beverage was found to be homogeneous, without a phase separation during shelf-life. Significant increase beverage viscosity was found (FIG. 1). Improved texture/mouthfeel of the beverages was found by the sensory panelists (FIG. 3).

Example 8

The RTD beverage with controlled protein aggregation was prepared as in Example 7 process, but using 125 g of anhydrous citric acid.

Beverage physico-chemical properties were evaluated and sensory characteristics were judged by trained sensory panelists. Physical stability of the beverage was good. However, viscosity and texture decreases as compared to those with 0.080% and 0.095% citric acid products (FIG. 1). Sandy mouthfeel and sour notes were perceived by sensory evaluation (FIG. 4).

Example 9

The RTD beverage with controlled protein aggregation was prepared as in Example 4 process, but using 150 g of guar gum.

Beverage physico-chemical properties were evaluated and sensory characteristics were judged by trained sensory panelists. Physical stability of the beverage was good.

Viscosity increase was found. Sensory evaluation showed improved beverage texture/mouthfeel.

Example 10

The RTD beverage with controlled protein aggregation was prepared as in Example 4 process, but using 200 g of guar gum.

Beverage physico-chemical properties were evaluated and sensory characteristics were judged by trained sensory panelists. Physical stability of the beverage was good. Significant increase beverage viscosity was found. Sensory evaluation showed increased in beverage body but slight slimy mouthfeel was detected.

Example 11

The RTD beverage with controlled protein aggregation was prepared as in Example 4 process, but with the addition of 1 kg non-fat dry milk.

Beverage physico-chemical properties were evaluated and sensory characteristics were judged by trained sensory panelists. Physical stability of the beverage was good. Significant increase beverage viscosity was found. Sensory evaluation showed improved beverage texture/mouthfeel.

The invention claimed is:

1. A ready to drink (RTD) beverage product comprising:
   milk comprising casein and whey proteins, wherein a ratio between the casein and the whey proteins ranges from 75:25 to 60:40, and the milk comprises 0.5 to 2.5 wt. % milk proteins and 0.5 to 1.5 wt. % milk fat based on the weight of the RTD beverage;
   added sugars up to 5 wt. % of the RTD beverage;
   an acidifier selected from the group consisting of (a) lactic acid in an amount of 0.065 to 0.10 wt. % and (b) citric acid in an amount of 0.03 to 0.09 wt. % of the RTD beverage;
   cocoa in a range of 0.5 to 1.5 wt. % of the RTD beverage; and
   a stabilizing system comprising a high acyl gellan gum in a range of 0.01 to 0.03 wt. %, and guar gum in a range of 0.09 to 0.2 wt. % of the RTD beverage,
   wherein the RTD beverage comprises casein-whey protein aggregates having a Sauter mean diameter value D[3,2] ranging from 6 to 15 μm as measured by laser diffraction.

2. The RTD beverage of claim 1, wherein the acidifier is lactic acid in the range from 0.065 to 0.10 wt. % of the RTD beverage.

3. The RTD beverage of claim 1, wherein the acidifier is citric acid in the range from 0.03 to 0.09 wt. % of the RTD beverage.

4. The RTD beverage of claim 1, comprising a calcium composition selected from the group consisting of calcium phosphate, calcium carbonate, calcium lactate-citrate, calcium citrate, and combinations thereof.

5. The RTD beverage of claim 1, further comprising sodium chloride in the range from 0.01 to 0.02 wt. % of the RTD beverage.

6. The RTD beverage of claim 1, further comprising a flavor.

7. A method of producing a RTD beverage, the method comprising:
   mixing ingredients to form a mixture, the ingredients comprising:
      milk comprising casein and whey proteins, wherein a ratio between the casein and the whey proteins ranges from 75:25 to 60:40, and the milk comprises 0.5 to 2.5 wt. % milk proteins and 0.5 to 1.5 wt. % milk fat based on the weight of RTD beverage,
      added sugars up to 5 wt. % of the RTD beverage,
      an acidifier selected from the group consisting of (a) lactic acid in an amount of 0.065 to 0.10 wt. % and (b) citric acid in an amount of 0.03 to 0.09 wt. % of the RTD beverage,
      cocoa in a range of 0.5 to 1.5 wt. % of the RTD beverage, and
      a stabilizing system comprising a high acyl gellan gum in a range of 0.01 to 0.03 wt/wt %, wt. % and guar gum in a range of 0.09 to 0.2 wt. % of the RTD beverage;
   homogenizing the mixture at total pressure ranging from 35-300 bars and temperature ranging from 65-80° C. to form a homogenized mixture;
   subsequently sterilizing the homogenized mixture at ultra-high temperature (UHT conditions at 136-150° C. for 3-30 seconds to obtain a beverage base product;
   cooling the obtained beverage base product to 30° C. or below to form a UHT beverage; and
   filling aseptically the UHT beverage in an aseptic container.

8. The process of claim 7, wherein the homogenization is in two steps comprising a first step wherein liquid mixture is exposed to a pressure in the range of 100 to 250 bars and a second step having pressure in the range of 35 to 50 bars following the first step.

9. The process of claim 7, wherein the cocoa is initially in a powder form, and the process further comprises hydrating the cocoa with water at about 90° C. for about 90 minutes to form a cocoa slurry.

10. The process of claim 7, wherein the cocoa is in a cocoa slurry form.

11. The process of claim 7, wherein the RTD beverage comprises casein-whey protein aggregates having a Sauter mean diameter value D[3,2] ranging from 6 to 15 μm as measured by laser diffraction.

12. The process of claim 7, wherein the acidifier is the citric acid in the range from 0.045 to 0.09 wt. % of the RTD beverage.

13. The RTD beverage of claim 1, wherein the acidifier is the citric acid in the range from 0.045 to 0.09 wt. % of the RTD beverage.

14. The RTD beverage of claim 1, further comprising a colorant.

15. The RTD beverage of claim 1, wherein the RTD beverage is shelf-stable for at least 6 months at 4° C., 20° C. and 30° C.

* * * * *